United States Patent
Kwon et al.

(10) Patent No.: US 12,231,193 B2
(45) Date of Patent: Feb. 18, 2025

(54) METHOD AND APPARATUS FOR PROCESSING SIGNAL IN MULTI-ANTENNA MULTICARRIER SYSTEM

(71) Applicants: SOLiD, INC., Seongnam-si (KR); INDUSTRY-UNIVERSITY COOPERATION FOUNDATION KOREA AEROSPACE UNIVERSITY, Goyang-si (KR)

(72) Inventors: Nagwon Kwon, Yongin-si (KR); Hyunchae Kim, Seoul (KR); Jihoon Choi, Seoul (KR)

(73) Assignees: SOLID, INC., Seongnam-si (KR); INDUSTRY-UNIVERSITY COOPERATION FOUNDATION KOREA AEROSPACE UNIVERSITY, Goyang-si (KR)

( * ) Notice: Subject to any disclaimer, the term of this patent is extended or adjusted under 35 U.S.C. 154(b) by 0 days.

(21) Appl. No.: 18/049,021

(22) Filed: Oct. 24, 2022

(65) Prior Publication Data

US 2023/0179272 A1 Jun. 8, 2023

(30) Foreign Application Priority Data

Oct. 22, 2021 (KR) .................. 10-2021-0141545
Oct. 20, 2022 (KR) .................. 10-2022-0135812

(51) Int. Cl.
*H04B 7/0456* (2017.01)
*H04L 5/00* (2006.01)

(52) U.S. Cl.
CPC ......... *H04B 7/0456* (2013.01); *H04L 5/0098* (2013.01)

(58) Field of Classification Search
CPC .. H04B 7/0456; H04B 7/0617; H04B 7/0639; H04B 7/066; H04L 5/0098; H04L 27/2634
See application file for complete search history.

(56) References Cited

U.S. PATENT DOCUMENTS

| | | | |
|---|---|---|---|
| 7,676,007 B1 | 3/2010 | Choi et al. | |
| 8,451,926 B2 | 5/2013 | Cheng et al. | |
| 2012/0114072 A1* | 5/2012 | Liu | H04B 7/0639 375/295 |
| 2018/0212809 A1* | 7/2018 | Bakulin | H04B 7/0465 |

(Continued)

OTHER PUBLICATIONS

Extended European Search Report dated Mar. 6, 2023 in European Application No. 22203015.7.

(Continued)

*Primary Examiner* — David B Lugo
(74) *Attorney, Agent, or Firm* — Sughrue Mion, PLLC

(57) ABSTRACT

A communication node included in a multi-antenna multicarrier system, when precoding matrices corresponding to some subcarriers from among subcarriers allocated to another communication node connected to the communication node are input, obtains precoding matrices for at least some subcarriers from among the allocated subcarriers by performing spherical interpolation on the input precoding matrices, maps the obtained precoding matrices for the at least some subcarriers to the subcarriers allocated to the other communication node, and performs precoding on the plurality of vector signals using the mapped precoding matrices.

16 Claims, 7 Drawing Sheets

(56) References Cited

U.S. PATENT DOCUMENTS

2019/0393948 A1* 12/2019 Zhao .................... H04B 7/0408

OTHER PUBLICATIONS

Choi et al., "Interpolation Based Unitary Precoding for Spatial Multiplexing MIMO-OFDM With Limited Feedback", IEEE Transactions on Signal Processing, 2006, vol. 54, No. 12, pp. 4730-4740 (11 pages total).
Pande et al., "Reduced Feedback MIMO-OFDM Precoding and Antenna Selection", IEEE Transactions on Signal Processing, 2007, vol. 55, No. 5, pp. 2284-2293, (10 pages total).

* cited by examiner

METHOD AND APPARATUS FOR PROCESSING SIGNAL IN MULTI-ANTENNA MULTICARRIER SYSTEM

CROSS-REFERENCE TO RELATED APPLICATIONS

This application claims the benefit of Korean Patent Application No. 10-2021-0141545, filed on Oct. 22, 2021, and No. 10-2022-0135812, filed on Oct. 20, 2022, in the Korean Intellectual Property Office, the disclosures of which are incorporated herein in their entireties by reference.

BACKGROUND

1. Field

The present disclosure relates to a method and apparatus for processing a signal in a multi-antenna multi-carrier system, and more particularly, to a method of processing and transmitting a signal using precoding for subcarriers.

2. Description of the Related Art

A multi-carrier transmission technique is a method of dividing a wideband into narrowbands composed of several subcarriers and transmitting the same, and has the advantage of reducing the complexity of a receiver for compensating for signal distortion caused by a channel while transmitting data at high speed. As a representative method of multi-carrier transmission, an orthogonal frequency division multiplexing (OFDM) method is used that minimizes a subcarrier interval while maintaining orthogonality between subcarriers. In addition, when data is simultaneously transmitted to multiple users, the OFDM method may be extended to an orthogonal frequency division multiple access (OFDMA) method combining OFDM and frequency division multiplexing.

As a method for increasing transmission capacity while maintaining the same transmission bandwidth and transmission power, a system using multiple antennas for a transmitter and a receiver is widely applied. A representative example of such a multi-antenna system is a multiple-input multiple-output (MIMO) system. When a multi-antenna system is used, transmission speed may be increased through spatial multiplexing or transmission link reliability may be improved through diversity gain acquisition. The MIMO system may be easily combined with the multi-carrier transmission technique. For example, an MIMO-OFDM transmission method is used in wireless LAN standards such as IEEE 802.11n, IEEE 802.11ac, and IEEE 802.11ax, and an MIMO-OFDMA transmission method is used in 4G long-term evolution (LTE) and 5G new radio (NR) downlink.

An MIMO transmission method is divided into an open-loop MIMO technique that does not use channel state information at a transmitting end and a closed-loop MIMO technique that performs precoding or beamforming using channel state information at a transmitting end. In general, a closed-loop MIMO system outperforms an open-loop MIMO system, but a process for obtaining channel state information in a transmitter is additionally required and precoding needs to be performed, and thus delay may occur at high speed as computational complexity increases.

When time-division multiplexing is used and uplink and downlink channels are symmetrical, a transmitting end estimates a channel using pilot symbols or reference signals in uplink and determines a downlink precoding matrix using this. When time division multiplexing is used but the uplink and downlink channels are asymmetric due to interference signals or frequency division multiplexing is used, a receiving end estimates channel state information using pilot symbols or reference signals, determines a precoding matrix using the estimated channel state information, and transmits precoding matrix information to a transmitting end through a feedback channel.

In the case of 4G LTE, 1024 subcarriers are used when a 10 MHz bandwidth is used, and 2048 subcarriers are used when a 20 MHz bandwidth is used. In addition, in the case of 5G NR, a 100 MHz bandwidth is used in a band below 6 GHZ, and 4096 subcarriers are used when subcarrier spacing is 30 kHz. In the case of 4G LTE, frequency division multiplexing is usually used, and in the case of 5G NR, time division multiplexing is used. However, because uplink and downlink are asymmetrical due to interference, a method of determining a precoding matrix at a receiving end and then transmitting the result to a transmitting end is used. In this case, when precoding matrices for all subcarriers are individually defined, the number of subcarriers is very large, resulting in an excessive increase in the amount of feedback information.

Subcarrier channels adjacent to each other in a frequency domain have high correlation. Using this, there is also a cluster technique that reduces the amount of feedback information by grouping adjacent subcarriers into clusters and using the same precoding matrix within the same cluster. However, in the case of the cluster technique, when the cluster size increases, correlation between subcarriers in the same cluster decreases, resulting in deterioration of precoding performance, and in particular, precoding performance for subcarriers close to a cluster boundary significantly deteriorates.

SUMMARY

Provided are methods of improving precoding performance of subcarriers in a multi-antenna multi-carrier system.

According to an aspect of an embodiment, a communication node included in a multi-antenna multi-carrier system includes a precoder configured to perform precoding on a signal to be transmitted to another communication node connected to the communication node, the precoder comprises: an S/P converter configured to generate a plurality of vector signals allocated to respective subcarriers allocated to the other communication node by performing serial-to-parallel (S/P) conversion on a signal including a plurality of modulated symbols; at least one spherical interpolator, when precoding matrices corresponding to some subcarriers from among the subcarriers allocated to the other communication node are input, configured to obtain precoding matrices for at least some subcarriers from among the allocated subcarriers by performing spherical interpolation on the input precoding matrices; a precoding matrix-subcarrier mapping block configured to map the obtained precoding matrices for the at least some subcarriers to the subcarriers allocated to the other communication node; and at least one precoding block configured to perform precoding on the plurality of vector signals using the mapped precoding matrices.

According to an exemplary embodiment, the at least one spherical interpolator obtains precoding matrices for at least some subcarriers from among the allocated subcarriers by performing spherical interpolation on two adjacent precoding matrices from among the precoding matrices corresponding to the some subcarriers, respectively.

According to an exemplary embodiment, the at least one spherical interpolator performs the spherical interpolation to obtain precoding matrices for all the allocated subcarriers, and the precoding matrix-subcarrier mapping block maps the obtained precoding matrices for all the allocated subcarriers to the allocated subcarriers.

According to an exemplary embodiment, the at least one spherical interpolator performs the spherical interpolation to obtain precoding matrices for some subcarriers from among the allocated subcarriers, the obtained precoding matrices correspond to precoding matrices respectively corresponding to clusters in which the allocated subcarriers are divided into a certain number of consecutive subcarriers, and the precoding matrix-subcarrier mapping block maps an identical precoding matrix to subcarriers included in an identical cluster.

According to an exemplary embodiment, the communication node further comprises a receiver configured to receive information on precoding matrices corresponding to the some subcarriers from the other communication node.

According to an exemplary embodiment, the receiver receives codebook indices corresponding to precoding matrices corresponding to the some subcarriers, and the precoder obtains precoding matrices corresponding to the some subcarriers based on the received codebook indices.

According to an exemplary embodiment, the communication node further comprises an inverse discrete Fourier transformer configured to convert each of a plurality of vector signals precoded by the at least one precoding block into a time-domain signal; a P/S converter configured to perform parallel-to-serial (P/S) conversion of the converted time-domain signals; a cyclic prefix (CP) inserter configured to insert a CP into a P/S converted signal; and a plurality of antennas configured to transmit a CP-inserted signal to the other communication node.

According to an exemplary embodiment, the communication node is implemented as a base station, a router, or a remote unit of a repeater.

According to an aspect of an embodiment, a communication node included in a multi-antenna multi-carrier system includes: a channel estimator configured to estimate a downlink frequency domain channel using a pilot or reference signal included in a downlink signal received from another communication node through a plurality of antennas; a precoding matrix selector configured to select precoding matrices corresponding to some subcarriers from among subcarriers allocated to the communication node, based on the estimated downlink frequency domain channel; and a transmitter configured to transmit information about the selected precoding matrices to the other communication node, the precoding matrix selector selects some subcarriers from among the allocated subcarriers, and defines a first precoding matrix for a first subcarrier from among the selected some subcarriers, and defines a precoding matrix for each of the selected remaining subcarriers based on the first precoding matrix for the first subcarrier and spherical interpolation between adjacent subcarriers.

According to an exemplary embodiment, the precoding matrix selector selects the some subcarriers by selecting one subcarrier in each of clusters in which the allocated subcarriers are divided into a certain number of consecutive subcarriers, and defines one of a plurality of predefined precoding matrix candidates as the first precoding matrix based on a sum transmission rate or signal-to-noise ratio of a first cluster including the first subcarrier.

According to an exemplary embodiment, the precoding matrix selector performs spherical interpolation on a precoding matrix for an mth subcarrier and each of precoding matrix candidates for an (m+1)th subcarrier from among the selected subcarriers, and calculates a performance reference value for a result of the spherical interpolation and defines one of the precoding matrix candidates for the (m+1)th subcarrier as a precoding matrix for the (m+1)th subcarrier, m increases sequentially from 1, and the performance reference value comprises an aggregate transmission rate or a signal-to-noise ratio.

According to an exemplary embodiment, the communication node further comprises a codebook index converter configured to convert each of the selected precoding matrices into a codebook index, and the transmitter transmits the converted codebook index to the other communication node.

According to an exemplary embodiment, the communication node is implemented as a terminal receiving a communication service through connection with the other communication node.

According to an aspect of an embodiment, a signal processing method of a multi-antenna multi-carrier system comprises: performing, by a transmitting end included in the multi-antenna multi-carrier system, precoding on a signal to be transmitted to a receiving end connected to the transmitting end; transmitting, by the transmitting end, a precoded downlink signal to the receiving end; and transmitting, by the receiving end, information about precoding matrices based on the downlink signal received from the transmitting end to the transmitting end.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
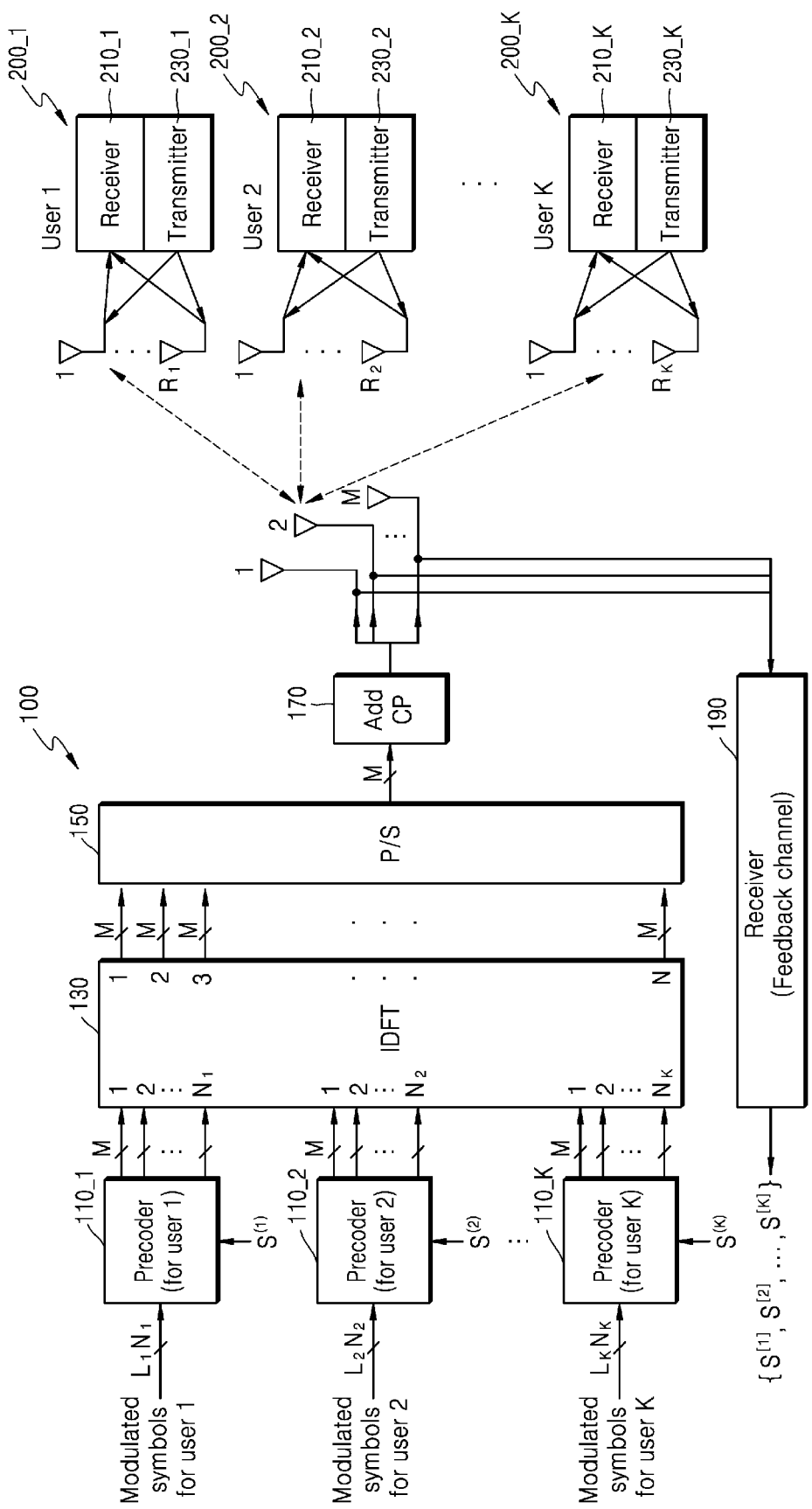
FIG. 1 is a block diagram schematically illustrating configurations of a transmitting end and a receiving end included in a multi-antenna multi-carrier system according to an embodiment.

Embodiments according to the inventive concept are provided to more completely explain the inventive concept to one of ordinary skill in the art, and the following embodiments may be modified in various other forms and the scope of the inventive concept is not limited to the following embodiments. Rather, these embodiments are provided so that the disclosure will be thorough and complete, and will fully convey the scope of the inventive concept to one of ordinary skill in the art.

It will be understood that, although the terms first, second, etc. may be used herein to describe various members, regions, layers, sections, and/or components, these members, regions, layers, sections, and/or components should not be limited by these terms. These terms do not denote any order, quantity, or importance, but rather are only used to distinguish one component, region, layer, and/or section from another component, region, layer, and/or section. Thus, a first member, component, region, layer, or section discussed below could be termed a second member, component, region, layer, or section without departing from the teachings of embodiments. For example, as long as within the scope of this disclosure, a first component may be named as a second component, and a second component may be named as a first component.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When a certain embodiment may be implemented differently, a specific process order may be performed differently from the described order. For example, two consecutively described processes may be performed substantially at the same time or performed in an order opposite to the described order.

In the drawings, variations from the illustrated shapes may be expected as a result of, for example, manufacturing techniques and/or tolerances. Thus, embodiments of the inventive concept should not be construed as being limited to the particular shapes of regions illustrated herein but may include deviations in shapes that result, for example, from manufacturing processes. Like reference numerals in the drawings denote like elements, and thus their overlapped explanations are omitted.

As used herein, the term "and/or" includes any and all combinations of one or more of the associated listed items.

Hereinafter, embodiments of the inventive concept will be described in detail with reference to the accompanying drawings.

In the following specification, a system in which a multi-antenna multi-carrier system supports multi-user transmission is considered, and a closed-loop MIMO-OFDMA system is exemplarily assumed. However, an example of a multi-antenna multi-carrier system to which embodiments are applied is not limited to the closed-loop MIMO-OFDMA system, and may be applied to similar types of systems.

FIG. 1 is a block diagram schematically illustrating configurations of a transmitting end and a receiving end included in a multi-antenna multi-carrier system according to an embodiment.

Referring to FIG. 1, the multi-antenna multi-carrier system according to an embodiment may include a transmitting end 100 and a plurality of receiving ends 200_1 to 200_K (where K is a natural number greater than or equal to 2). Each of the transmitting end and the receiving end may correspond to a communication node constituting a multi-antenna multi-carrier system. For example, the transmitting end 100 may correspond to a base station, a router, or a remote unit RU of a repeater, and the plurality of receiving ends may correspond to user equipment receiving communication services through connection with the transmitting end.

In FIG. 1, K may mean the number of receiving ends (or users), M may mean the number of transmitting antennas of the transmitting end 100, N may mean the number of OFDM subcarriers, $L_k$ may mean the number of simultaneously transmitted data streams of the $k^{th}$ receiving end 200_k, $N_k$ may mean the number of subcarriers allocated to the $k^{th}$ receiving end 200_k from among all subcarriers, and $R_k$ may mean the number of receiving antennas of the $k^{th}$ receiving end 200_k (k=1, 2, . . . , K). In addition, $S^{(k)}$ may represent a set composed of precoding matrices transmitted from the $k^{th}$ receiving end 200_k to the transmitting end 100 through a feedback channel.

The transmitting end 100 may generate a signal to be transmitted to each receiving end through a known process such as channel coding, interleaving, and modulation using data to be transmitted to each receiving end (or user). The generated signal may include $L_k \times N_k$ modulated symbols based on the number $L_k$ of simultaneously transmitted data streams of each receiving end and the number $N_k$ of subcarriers allocated to each receiving end, and the signal may be input to a precoder 110_k for the $k^{th}$ receiving end 200_k.

The precoder 110_k may perform precoding on the input signal including the $L_k \times N_k$ modulated symbols, and may allocate the precoded signal to the subcarrier $N_k$ allocated to the $k^{th}$ receiving end 200_k. In more detail, the precoder 110_k bundles the $L_k \times N_k$ modulated symbols into $L_k \times 1$ vectors through serial-to-parallel (S/P) conversion and divides them into $N_k$ numbers. In addition, the precoder 110_k may perform precoding for each $N_k$ subcarrier based on a precoding matrix included in the set S (k).

In this case, according to an embodiment, the precoding matrix included in the set $S^{(k)}$ may include precoding matrices corresponding to some of the $N_k$ subcarriers. The precoder 110_k may obtain precoding matrices corresponding to the remaining subcarriers by applying spherical interpolation to the included precoding matrices, and may perform precoding for each $N_k$ subcarrier using the precoding matrix included in the set s (k) and the obtained precoding matrices. An operation of obtaining a precoding matrix to which spherical interpolation is applied and a precoding operation of the precoder 110_k will be described in detail with reference to FIGS. 2 and 3 later.

After precoding is performed, a signal transmitted to each subcarrier is expressed as an M×1 vector. When precoding is performed on each of signals to be transmitted to the plurality of receiving ends 200_1 to 200_K, the precoded signal may be allocated to $N_1+N_2+ \ldots +N_k$ subcarriers from among the total N subcarriers. An inverse discrete Fourier transformer 130 may convert the allocated signal into a time-domain signal through inverse discrete Fourier transform (IDFT), and a parallel-to-serial (P/S) converter 150 may convert the converted signal into an M×1 vector signal arranged in chronological order by P/S conversion. A cyclic prefix (CP) inserter 170 may insert a CP into the converted M×1 vector signal, and the CP-inserted signal may be sequentially transmitted through M transmitting antennas.

Each of the plurality of receiving ends 200_1 to 200_K may separate and receive a signal of a band allocated to each of the plurality of receiving ends 200_1 to 200_K from among all signals transmitted from the transmitting end 100 using receivers 210_1 to 210_K and a plurality of antennas. Each of the plurality of receiving ends 200_1 to 200_K may restore transmission data from the received signal through a known demodulation process such as channel estimation, MIMO detection process, digital demodulation, deinterleaving, and channel decoding using a pilot or reference signal.

According to an embodiment, after performing channel estimation using the pilot or reference signal, the receiving end 200_$k$ may select precoding matrices corresponding to $f_k(f_k \leq N_k)$ subcarriers corresponding to some of the $N_k$ subcarriers allocated to the receiving end 200_$k$. The receiving end 200_$k$ may obtain $f_k$ codebook indices corresponding to the selected $f_k$ precoding matrices using a precoding matrix codebook $C^{(k)}$ predefined between the transmitting end 100 and the receiving end 200_$k$. The transmitter 230_$k$ of the receiving end 200_$k$ may transmit the obtained codebook indices to a receiver 190 of the transmitting end 100 through an uplink feedback channel. The transmitting end 100 may obtain the set $S^{(k)}$ including the $f_k$ precoding matrices using the received codebook indices. The transmitting end 100 may perform precoding on a signal to be transmitted to the $k^{th}$ receiving end 200_$k$ using the obtained set $S^{(k)}$ as described above.

Figure 2:
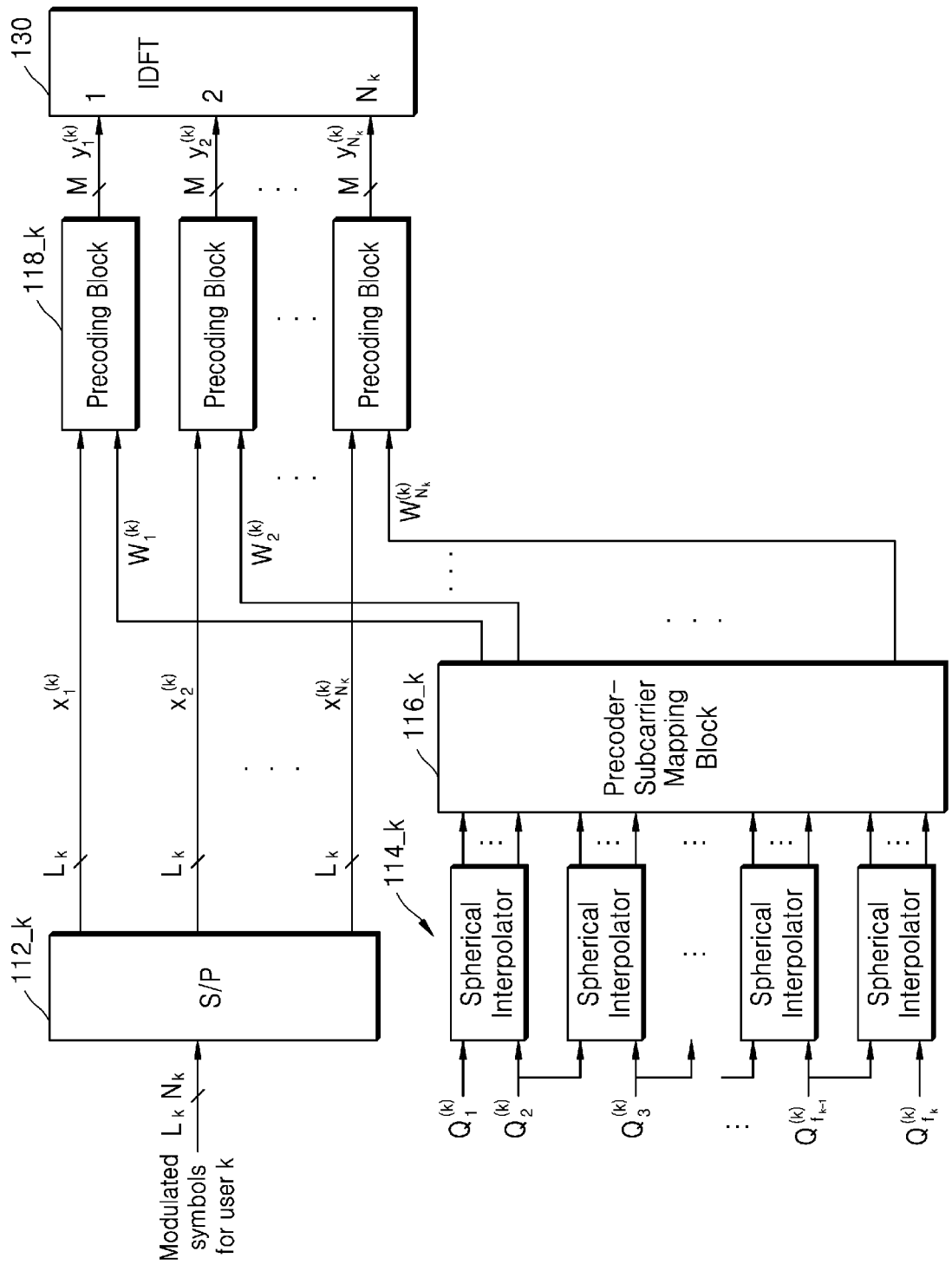
FIG. 2 is a block diagram illustrating an exemplary configuration of a precoder shown in FIG. 1 in more detail.
Figure 3:
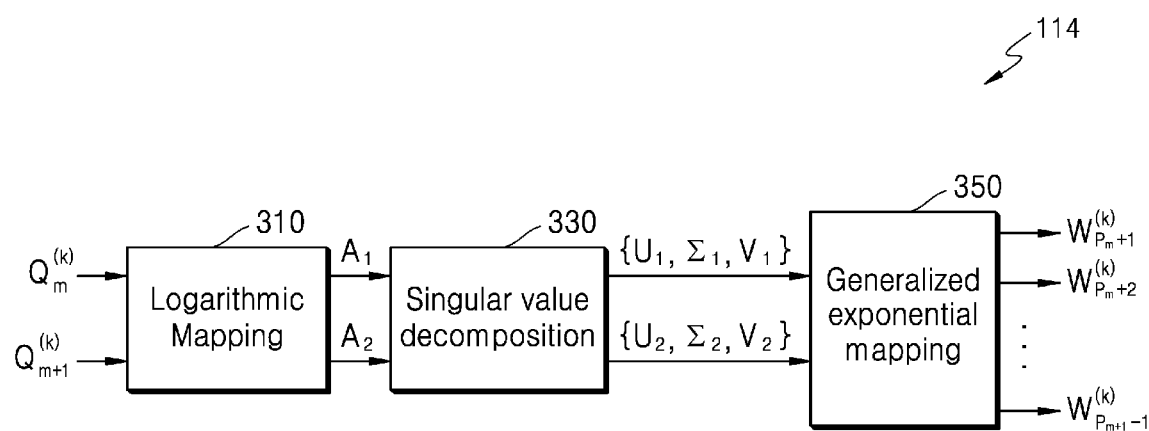
FIG. 3 is an exemplary diagram for explaining a spherical interpolation process of a precoding matrix performed in a spherical interpolator of FIG. 2.

FIG. 2 is a block diagram illustrating an exemplary configuration of the precoder shown in FIG. 1 in more detail. FIG. 3 is an exemplary diagram for explaining a spherical interpolation process of a precoding matrix performed in a spherical interpolator of FIG. 2.

Referring to FIG. 2, the precoder 110_$k$ corresponding to the $k^{th}$ receiving end 200_$k$ may include an S/P converter 112_$k$, a plurality of spherical interpolators 114_$k$, a precoding matrix-subcarrier mapping block 116_$k$, and a plurality of precoding blocks 118_$k$. Components included in the precoder 110_$k$ may be implemented in hardware, software, or a combination of hardware and software.

The S/P converter 112_$k$ may obtain $N_k$ $L_k \times 1$ vectors $x_1^{(k)}, x_2^{(k)}, \ldots, x_{N_k}^{(k)}$ by performing S/P conversion on a signal including $L_k \times N_k$ modulated symbols. The $L_k \times 1$ vectors may be allocated to different subcarriers, respectively.

Each of the plurality of spherical interpolators 114_$k$ may perform spherical interpolation on two adjacent precoding matrices from among a set $S^{(k)} = \{Q_1^{(k)}, Q_2^{(k)}, \ldots, Q_{f_k}^{(k)}\}$ of precoding matrices received through a feedback channel. The number of received precoding matrices $f_k$ may be smaller than the number of subcarriers $N_k$, but may be the same according to embodiments. For example, the first spherical interpolator may perform spherical interpolation on the first precoding matrix $Q_1^{(k)}$ and the second precoding matrix $Q_2^{(k)}$, and the second spherical interpolator may perform spherical interpolation on the second precoding matrix $Q_2^{(k)}$ and the third precoding matrix $Q_3^{(k)}$. That is, when $f_k$ precoding matrices are received through a feedback channel, $(f_k-1)$ spherical interpolators 114_$k$ may be used. According to an embodiment, the precoder 110_$k$ may include only one spherical interpolator 114_$k$. In this case, the spherical interpolator 114_$k$ may sequentially perform spherical interpolation on two adjacent precoding matrices.

The plurality of spherical interpolators 114_$k$ may be implemented to output precoding matrices corresponding to all subcarriers or output precoding matrices corresponding to some subcarriers. For example, it is assumed that $N_k=13$, $f_k=3$ and $Q_1^{(k)}$ is a precoding matrix for the first subcarrier, $Q_2^{(k)}$ is a precoding matrix for the 7th subcarrier, and $Q_3^{(k)}$ is a precoding matrix for the $13^{th}$ subcarrier. In this case, a spherically interpolated precoding matrix $W_1^{(k)}$ for the first subcarrier corresponds to $Q_1^{(k)}$, a spherically interpolated precoding matrix $W_7^{(k)}$ for the $7^{th}$ subcarrier corresponds to $Q_2^{(k)}$, and a spherically interpolated precoding matrix $W_{13}^{(k)}$ for the $13^{th}$ subcarrier corresponds to $Q_3^{(k)}$.

When the plurality of spherical interpolators 114_$k$ are implemented to output spherically interpolated precoding matrices corresponding to all subcarriers, the spherical interpolator 114_$k$ using $Q_1^{(k)}$ and $Q_2^{(k)}$ as inputs may output a spherically interpolated precoding matrix $\{W_2^{(k)}, W_3^{(k)}, W_4^{(k)}, W_5^{(k)}, W_6^{(k)}\}$ for the second to sixth subcarriers through spherical interpolation, and the spherical interpolator 114_$k$ using $Q_2^{(k)}$ and $Q_3^{(k)}$ as inputs may output a spherically interpolated precoding matrix $\{W_8^{(k)}, W_9^{(k)}, W_{10}^{(k)}, W_{11}^{(k)}, W_{12}^{(k)}\}$ for the $8^{th}$ to $12^{th}$ subcarriers through spherical interpolation. The precoding matrix-subcarrier mapping block 116_$k$ may map precoding matrices $W_1^{(k)}$ to $W_{13}^{(k)}$ spherically interpolated by the spherical interpolator 114_$k$ to 13 subcarriers. This will be described in more detail with reference to FIG. 3 below.

Referring to FIG. 3, when two adjacent precoding matrices $Q_m^{(k)}$ and $Q_{m+1}^{(k)}$ are input, the spherical interpolator 114 may perform logarithmic mapping 310 on the input precoding matrices. When defining $Q_m^{(k)}$ as a starting point, a log-mapped matrix in direction $B_1$ adjacent to $Q_m^{(k)}$ as $A_1$, $Q_{m+1}^{(k)}$ as a starting point, and a log-mapped matrix in direction $B_2$ adjacent to $Q_{m+1}^{(k)}$ as $A_2$, $A_1$ and $A_2$ are calculated as in Equation 1 and Equation 2, respectively.

$$A_1 = \{I_M - Q_m^{(k)}(Q_m^{(k)})^H\} B_1 \{(Q_m^{(k)})^H B_1\}^{-1} \quad \text{[Equation 1]}$$

$$A_2 = \{I_M - Q_{m+1}^{(k)}(Q_{m+1}^{(k)})^H\} B_2 \{(Q_{m+1}^{(k)})^H B_2\}^{-1} \quad \text{[Equation 2]}$$

Where $B_1$ and $B_2$ are $M \times L_k$ complex matrices, satisfy $B_1^H B_1 = I_{L_k}$ and $B_2^H B_2 = I_{L_k}$, and are set considering spherical interpolation performance. The log-mapped matrices $A_1$ and $A_2$ may be expressed as Equation 3 below using singular value decomposition 330.

$$A_j = U_j \Sigma_j V_j^H, j=1,2 \quad \text{[Equation 3]}$$

Where $U_j$ is an $M \times L_k$ complex matrix that satisfies $U_j^H U_j = I_{L_k}$, $\Sigma_j$ is an $L_k \times L_k$ diagonal matrix with diagonal elements having real values greater than or equal to 0, and $V_j$ is an $L_k \times L_k$ complex matrix that satisfies $V_j^H V_j = I_{L_k}$. In this case, generalized exponential mapping 350 may be expressed as Equation 4 below.

$$W_j^{(k)} = \begin{cases} Q_m^{(k)} V_1 \cos\left(\dfrac{j - p_m}{p_{m+1} - p_m} \tan^{-1}(\Sigma_1)\right) + \\ U_1 \sin\left(\dfrac{j - p_m}{p_{m+1} - p_m} \tan^{-1}(\Sigma_1)\right), & \text{if } j - p_m \leq p_{m+1} - p_m \\ Q_{m+1}^{(k)} V_2 \cos\left(\dfrac{j - p_m}{p_{m+1} - p_m} \tan^{-1}(\Sigma_2)\right) + \\ U_2 \sin\left(\dfrac{j - p_m}{p_{m+1} - p_m} \tan^{-1}(\Sigma_2)\right) & \text{if } j - p_m > p_{m+1} - p_m \end{cases} \quad \text{[Equation 4]}$$

Where $p_m$ is a subcarrier index corresponding to $Q_m^{(k)}$, $p_{m+1}$ is a subcarrier index corresponding to $Q_{m+1}^{(k)}$, and j is a subcarrier index for calculating a precoding matrix through spherical interpolation. In addition, $\sin(\Sigma)$ and $\cos(\Sigma)$ functions are calculated only for diagonal elements of a $\Sigma$ matrix.

As in the example presented in FIG. 3, it is assumed that $N_k=13$ and $f_k=3$, $Q_1^{(k)}$ is a precoding matrix for subcarrier 1, $Q_2^{(k)}$ is a precoding matrix for subcarrier 7, and $Q_3^{(k)}$ is a precoding matrix for subcarrier 13, respectively. When precoders corresponding to all subcarriers are calculated through spherical interpolation, they are defined as $p_1=1$, $p_2=7$, $p_3=13$, and $W_1^{(k)} = Q_1^{(k)}$, $W_7^{(k)} = Q_2^{(k)}$, $W_{13}^{(k)} = Q_3^{(k)}$, $W_{13}^{(k)} = Q_3^{(k)}$. $\{W_2^{(k)}, W_3^{(k)}, W_4^{(k)}, W_5^{(k)}, W_6^{(k)}\}$ is calculated through spherical interpolation defined in Equation 4 using $Q_1^{(k)}$ and $Q_2^{(k)}$ as inputs. That is, j=2, 3, . . . , 6. In addition, $\{W_8^{(k)}, W_9^{(k)}, W_{10}^{(k)}, W_{11}^{(k)}, W_{12}^{(k)}\}$ is calculated through spherical interpolation defined in Equation 4 using Q) and Q as inputs. That is, j=8, 9, . . . , 12. When it is desired to calculate only precoder matrices for some subcarriers, spherical interpolation using Equation 4 may be performed after setting a corresponding subcarrier index to j.

Referring back to FIG. 2, when the plurality of spherical interpolators $114\_k$ are implemented to output spherical interpolated precoding matrices corresponding to some subcarriers, the spherical interpolator $114\_k$ using $Q_1^{(k)}$ and $Q_2^{(k)}$ as inputs may output a spherical interpolated precoding matrix $W_4^{(k)}$ for the fourth subcarrier through spherical interpolation, and the spherical interpolator $114\_k$ using $Q_1^{(k)}$ and $Q_2^{(k)}$ as inputs may output a spherically interpolated precoding matrix $W_4^{(k)}$ for the 10th subcarrier through spherical interpolation. The precoding matrix-subcarrier mapping block $116\_k$, using the precoding matrices $W_1^{(k)}$, $W_4^{(k)}$, $W_7^{(k)}$, $W_{10}^{(k)}$, $W_{13}^{(k)}$, may map the spherically interpolated precoding matrices to 13 subcarriers. For example, the mapping block $116\_k$ may divide all subcarriers into clusters corresponding to the number of output precoding matrices, and may map an identical precoding matrix to subcarriers included in the same cluster. In this case, the mapping block $116\_k$ may set precoding matrices to $W_1^{(k)}=W_2^{(k)}$, $W_3^{(k)}=W_4^{(k)}=W_5^{(k)}$, $W_6^{(k)}=W_7^{(k)}=W_8^{(k)}$, $W_9^{(k)}=W_{10}^{(k)}=W_{11}^{(k)}$, and $W_{12}^{(k)}=W_{13}^{(k)}$, and may map the set precoding matrices to subcarriers.

The plurality of precoding blocks $118\_k$ may obtain a frequency domain M×1 vector $y_n^{(k)}$ by performing precoding on a vector input from the S/P converter $112\_k$ using a precoding matrix input from the precoding matrix-subcarrier mapping block $116\_k$. The process of obtaining $y_n^{(k)}$ may be expressed as Equation 5 below.

$$y_n^{(k)}=W_n^{(k)}x_n^{(k)}, n=1,2,\ldots,N_k \qquad \text{[Equation 5]}$$

According to an embodiment, the precoder $110\_k$ may include one precoding block $118\_k$. In this case, the precoding block $118\_k$ may sequentially perform precoding on vectors input from the S/P converter $112\_k$.

The precoder $110\_k$ according to an embodiment may obtain precoding matrices for subcarriers by applying a spherical interpolation technique, thereby minimizing degradation of precoding performance for some subcarriers.

Figure 4:
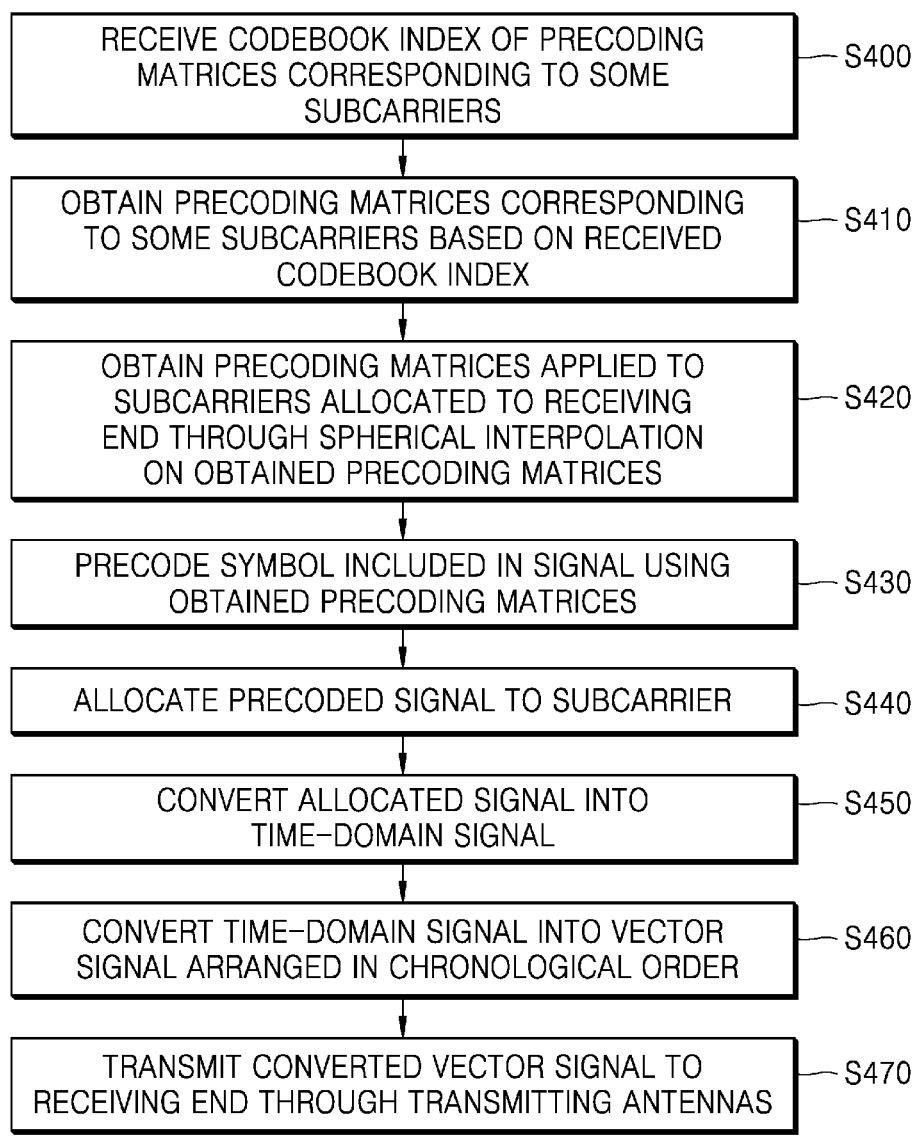
FIG. 4 is a flowchart for explaining a signal processing operation of a transmitting end according to an embodiment.

FIG. 4 is a flowchart for explaining a signal processing operation of a transmitting end according to an embodiment.

Referring to FIG. 4, in operation S400, the transmitting end 100 may receive a codebook index of precoding matrices corresponding to some subcarriers from the receiving end $200\_k$.

In operation S410, the transmitting end 100 may obtain precoding matrices corresponding to some subcarriers based on the received codebook index. As described above in FIG. 1, a precoding matrix codebook may be predefined between the transmitting end 100 and the receiving end $200\_k$, and the transmitting end 100 may obtain precoding matrices corresponding to the some subcarriers based on the precoding matrix codebook and the received codebook index.

As described above in FIGS. 1 to 3, in operation S420, the transmitting end 100 may obtain precoding matrices applied to subcarriers allocated to the receiving end $200\_k$ through spherical interpolation on the obtained precoding matrices. The transmitting end 100 may precode a symbol included in a signal using the obtained precoding matrices in operation S430, and may allocate the precoded signal to a subcarrier in operation S440.

As described above in FIG. 1, the transmitting end 100 may convert the allocated signal into a time-domain signal in operation S450, may convert the converted time-domain signal into a vector signal arranged in chronological order in operation S460, and may transmit the converted vector signal to the receiving end $200\_k$ through a plurality of transmitting antennas in operation S470.

Figure 5:
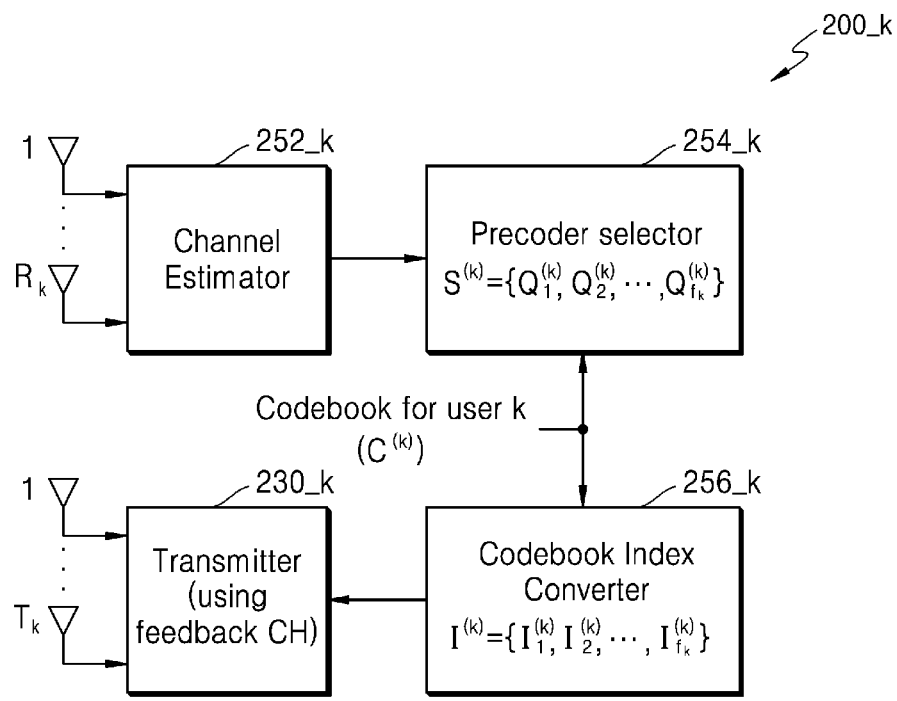
FIG. 5 is a block diagram illustrating an exemplary configuration of a receiving end shown in FIG. 1 in more detail.

FIG. 5 is a block diagram illustrating an exemplary configuration of the receiving end shown in FIG. 1 in more detail.

Referring to FIG. 5, the receiving end $200\_k$ may include a channel estimator $252\_k$, a precoding matrix selector $254\_k$, and a codebook index converter $256\_k$ in addition to the receiver and transmitter described above with reference to FIG. 1. The channel estimator $252\_k$, the precoding matrix selector $254\_k$, and the codebook index converter $256\_k$ may be implemented in hardware, software, or a combination thereof, and the components may be integrated or separated into at least one piece of hardware.

When a signal (downlink signal) is received through $R_k$ antennas, the channel estimator $252\_k$ estimates a downlink frequency domain channel using a pilot or reference signal included in the downlink signal.

The precoding matrix selector $254\_k$ may select precoding matrices for $f_k$ subchannels (subcarriers) from among $N_k$ subchannels (subcarriers) allocated to the $k^{th}$ receiving end $200\_k$ based on the estimated downlink frequency domain channel. In this case, a matrix candidate usable for precoding may be defined in the form of a codebook as shown in Equation 6 below, and the transmitting end 100 and the receiving end $200\_k$ may share it.

$$C^{(k)} = \{C_1^{(k)}, C_2^{(k)}, \ldots, C_{2^B}^{(k)}\} \qquad \text{[Equation 6]}$$

B is an integer greater than or equal to 1 representing the number of codebook index bits, and $C_j^{(k)}$ is an $M \times L_k$ complex matrix and satisfies $(C_j^{(k)})^H C_j^{(k)} = I_{L_k}$ ($I_n$ means an n×n identity matrix, and CH means conjugate transpose operation on matrix C). A precoding matrix corresponding to a feedback subcarrier is selected as one of matrices included in a codebook $C^{(k)}$. In this case, a set $S^{(k)}$ consists of selected $f_k$ precoding matrices ($S^{(k)}=\{Q_1^{(k)}, Q_2^{(k)}, \ldots, Q_{f_k}^{(k)}\}$).

In this case, $Q_n^{(k)} \in C^{(k)}$ and is an $M \times L_k$ complex matrix. For example, assuming that $N_k=13$, $f_k=3$, $B=4$, and $Q_1^{(k)}$ is a precoding matrix for subcarrier 1, $Q_2^{(k)}$ is a precoding matrix for subcarrier 7, and $Q_3^{(k)}$ is a precoding matrix for subcarrier 13, $Q_1^{(k)}$, $Q_2^{(k)}$, and $Q_3^{(k)}$ are selected as one matrix from $C^{(k)}=\{C_1^{(k)}, C_2^{(k)}, \ldots, C_{16}^{(k)}\}$. When selecting a precoding matrix from the codebook $C^{(k)}$, the precoding matrix selector $254\_k$ may apply various criteria for maximizing performance of a corresponding subcarrier or a band including the corresponding subcarrier, such as an aggregate transmission rate and an average signal-to-noise ratio. This will be described in more detail later with reference to FIGS. 6 and 7.

When a precoder set $S^{(k)}$ is defined by the precoding matrix selector $254\_k$, the codebook index converter $256\_k$ converts a precoding matrix included in the set $S^{(k)}$ into a codebook index using the codebook $C^{(k)}$. In more detail, when a codebook index corresponding to $Q_j^{(k)}$ is $I_j^{(k)}$ the entire converted codebook index may be defined as in Equation 7 below.

$$I^{(k)} = \{I_1^{(k)}, I_2^{(k)}, \ldots, I_{f_k}^{(k)}\} \qquad \text{[Equation 7]}$$

For example, when B=4, $C_j^{(k)}$ may be defined as a value obtained by converting (j−1) to binary number. That is, assuming that $Q_1^{(k)}=C_8^{(k)}$, $Q_2^{(k)}=C_2^{(k)}$, $Q_3^{(k)}=C_{16}^{(k)}$, corresponding codebook indices are defined as $I_1^{(k)}=0111$, $I_2^{(k)}=0001$, $I_3^{(k)}=1111$, respectively, and may be expressed as $I^{(k)}=\{0111, 0001, 1111\}$.

The transmitter 230_$k$ may transmit a codebook index set defined according to Equation 7 to the transmitting end 100 using an uplink feedback channel for the $k^{th}$ receiving end 200_$k$. In this case, the uplink feedback channel may be configured as a part of an uplink control channel or in the form of a piggyback channel added to an uplink data channel. When the number of receiving antennas of the $k^{th}$ receiving end 200_$k$ is $R_k$, the number of uplink transmitting antennas $T_k$ generally satisfies $T_k \leq R_k$ when transmitting and receiving antennas are shared and used. That is, the transmitter 230_$k$ may transmit an uplink signal using all or part of a receiving antenna.

That is, the receiving end 200_$k$ transmits only a codebook index set corresponding to precoding matrices for some subcarriers to the transmitting end 100, thereby preventing an excessive increase in the amount of feedback information and enabling efficient communication.

Figure 6:
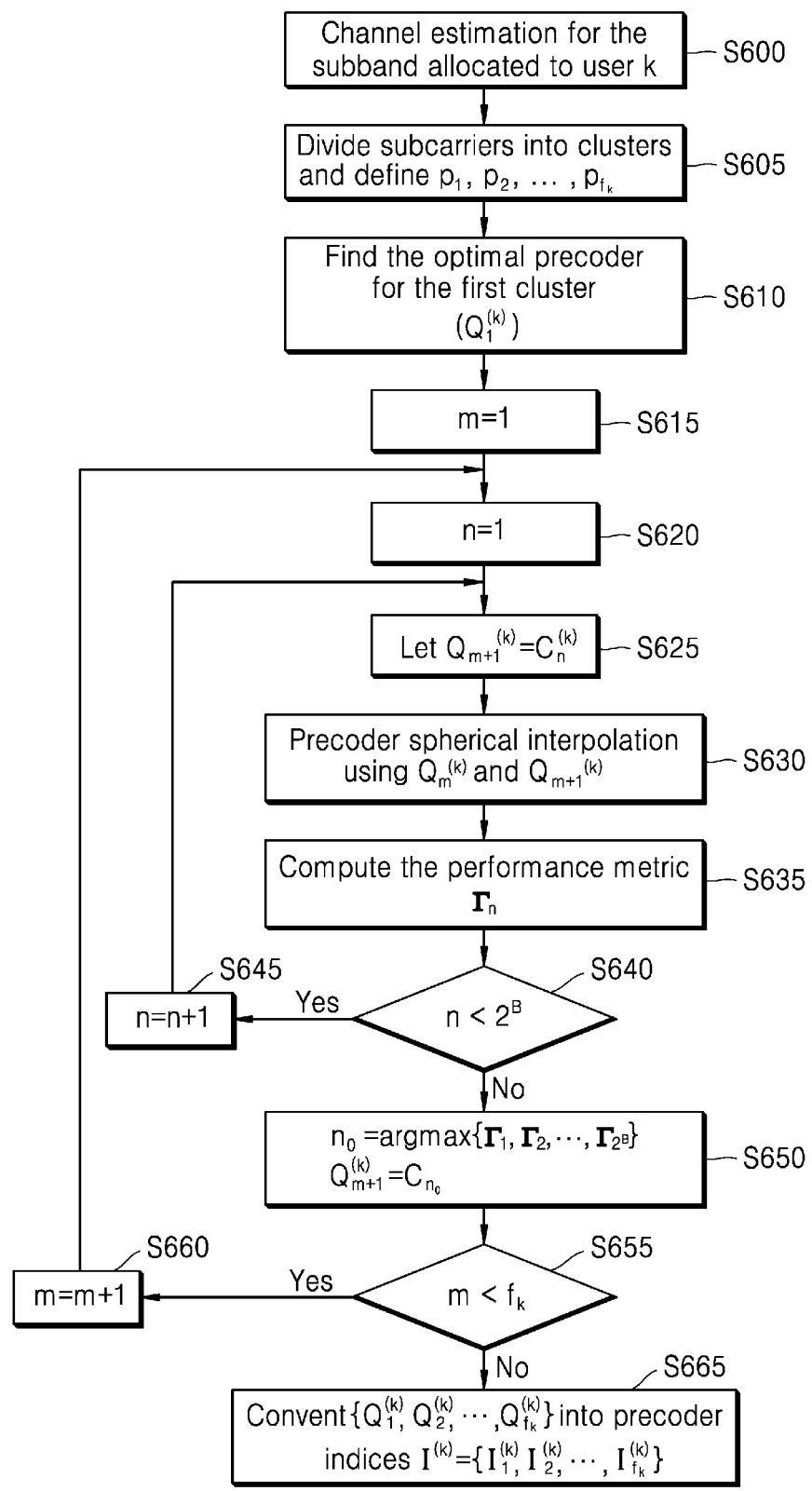
FIG. 6 is a flowchart for explaining a specific example of an operation of the receiving end shown in FIG. 1.

FIG. 6 is a flowchart for explaining a specific example of an operation of the receiving end shown in FIG. 1.

Referring to FIG. 6, in operation S600, the receiving end 200_$k$ may perform channel estimation for a band allocated to the receiving end 200_$k$ (or a user). As described above with reference to FIG. 5, the channel estimator 252_$k$ may estimate a downlink frequency domain channel using a pilot or reference signal included in a received downlink signal.

The receiving end 200_$k$ may select some of subcarriers allocated to the receiving end 200_$k$ based on the estimated downlink frequency domain channel and define a precoding matrix for one of the selected subcarriers. In more detail, in operation S605, the receiving end 200_$k$ may select some subcarriers by dividing subcarriers allocated to the receiving end 200_$k$ into clusters and selecting one subcarrier from each of the divided clusters. In this case, indices of the selected subcarriers may be defined as $p_1, p_2, \ldots, p_{f_k}$.

In operation S610, the receiving end 200_$k$ may define a precoding matrix for any one of the selected subcarriers. For example, the receiving end 200_$k$ may define an optimal precoding matrix $Q_1^{(k)}$ for the subcarrier $p_1$ of a first cluster. In this case, $Q_1^{(k)}$ may be selected from elements of the codebook $C^{(k)}$ based on a sum transmission rate or signal-to-noise ratio of the first cluster.

The receiving end 200_$k$ may calculate precoding matrices for the selected subcarriers $p_1, p_2, \ldots, p_{f_k}$ through spherical interpolation. For example, the receiving end 200_$k$ may perform spherical interpolation while changing a codebook of one undefined precoding matrix from among two adjacent precoding matrices input for spherical interpolation, and may calculate a performance reference value for a result of the spherical interpolation, thereby defining the one undefined precoding matrix.

In more detail, the receiving end 200_$k$ initializes m and n to 1 in operations S615 and S620, and defines m and n as a precoding matrix $Q_{m+1}^{(k)}=C_n^{(k)}$ of a subcarrier selected from the $(m+1)^{th}$ cluster in operation S625. In addition, in operation S630, the receiver 200_$k$ may calculate a precoding matrix $\{W_{p_m}, W_{p_m+1}, \ldots, W_{p_{m+1}}\}$ for subcarriers between subcarriers $p_m$ and $p_{m+1}$ by performing spherical interpolation on $Q_m^{(k)}$ and $Q_{m+1}^{(k)}$.

In operation S635, the receiving end 200_$k$ may calculate a performance reference value $\Gamma_n$ between the subcarriers $p_m$ to $p_{m+1}$ using the calculated precoding matrix $\{W_{p_m}, W_{p_m+1}, \ldots, W_{p_{m+1}}\}$. For example, $\Gamma_n$ may be defined as an aggregate transmission rate or a detection signal-to-noise ratio.

In operations S640 and S645, when n is less than 28, operations S625 to S635 may be repeated while adding n by 1. That is, the receiving end 200_$k$ may calculate the precoding matrices $\{W_{p_m}, W_{p_m+1}, \ldots, W_{p_{m+1}}\}$ for subcarriers between the subcarriers $p_m$ and $p_{m+1}$ while sequentially substituting elements of all codebooks into the precoding matrix $Q_{m+1}^{(k)}$, and may calculate the performance reference value $\Gamma_n$.

After calculating the precoding matrix $\{W_{p_m}, W_{p_m+1}, \ldots, W_{p_{m+1}}\}$ and the performance reference value $\Gamma_n$ by sequentially substituting elements of all codebooks (NO of operation S640), in operation S650, the receiving end 200_$k$ may determine a codebook element having the maximum performance reference value, and define the determined codebook element as $Q_{m+1}^{(k)}$. This may be expressed as Equation 8 below.

$$n_o = \arg\max\{\Gamma_1, \Gamma_2, \ldots, \Gamma_{2^B}\}$$

$$Q_{m+1}^{(k)} = C_{n_o} \qquad \text{[Equation 8]}$$

In addition, in operations S655 and S660, when m is smaller than $f_k$, the receiving end 200_$k$ may repeat operations S620 to S650 while increasing m by 1. Accordingly, for some of the subcarriers $p_1, p_2, \ldots, p_{f_k}$ selected in operation S605, a set $S^{(k)}=\{Q_1^{(k)}, Q_2^{(k)}, \ldots, Q_{f_k}^{(k)}\}$ of precoding matrices having optimal precoding performance may be obtained.

In operation S665, the receiving end 200_$k$ may convert $S^{(k)}=\{Q_1^{(k)}, Q_2^{(k)}, \ldots, Q_{f_k}^{(k)}\}$ into a codebook index $I^{(k)}=\{I_1^{(k)}, I_2^{(k)}, \ldots, I_{f_k}^{(k)}\}$ using the codebook $C^{(k)}$, and the codebook index may be represented by B bits. The receiving end 200_$k$ may transmit the converted codebook index $I^{(k)}=\{I_1^{(k)}, I_2^{(k)}, \ldots, I_{f_k}^{(k)}\}$ to the transmitting end 100 through a feedback channel.

That is, according to an embodiment, a receiving end may estimate a downlink frequency band channel from a signal received from a transmitting end, use the estimated channel to define precoding matrices for some of subcarriers allocated to the receiving end, and provide the defined precoding matrices to the transmitting end. In this case, the receiving end defines a precoding matrix having an optimal performance reference value by applying a spherical interpolation technique and then transmits a codebook index of the defined precoding matrix to the transmitting end, thereby improving precoding performance at the transmitting end and effectively reducing feedback information when transmitting information about the precoding matrix.

Figure 7:
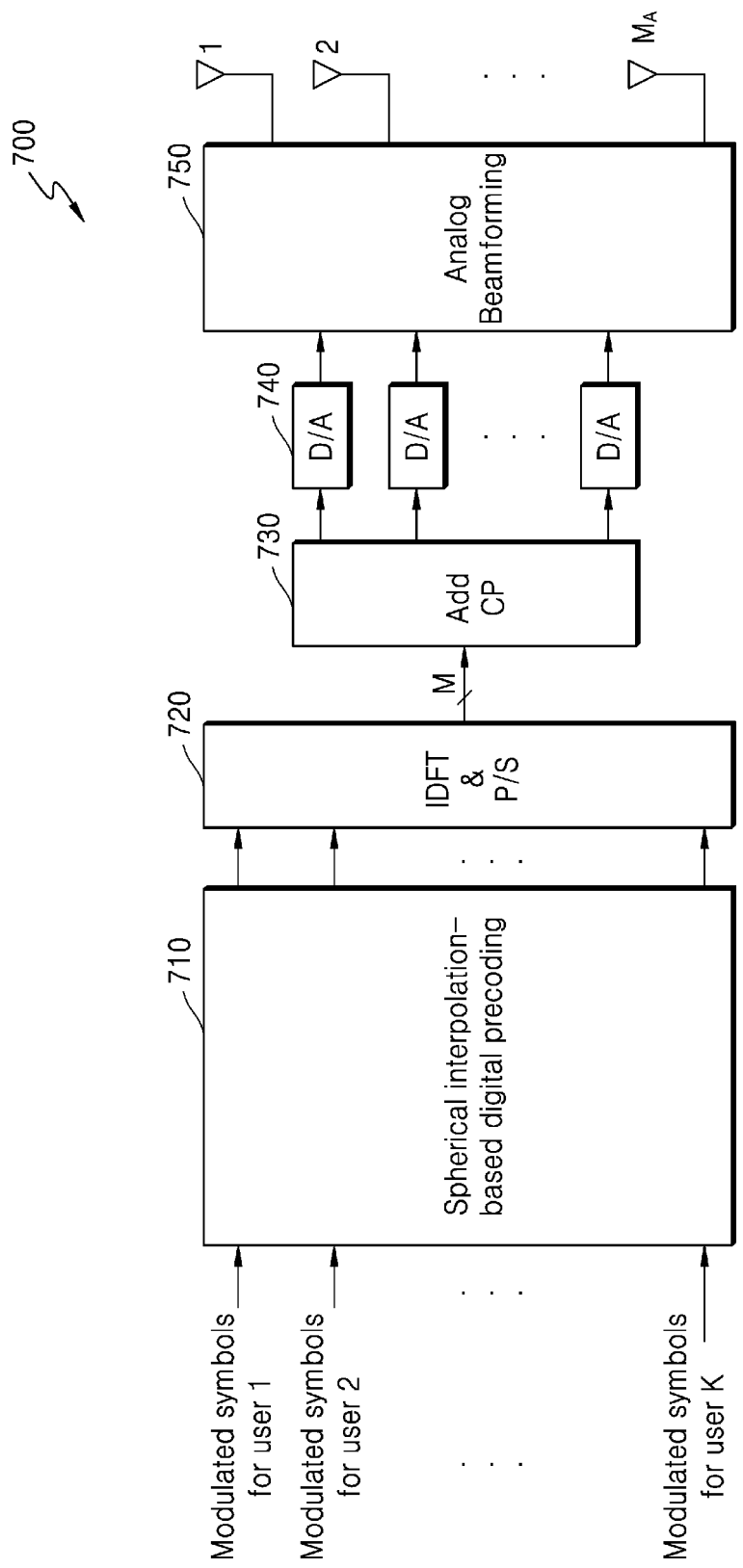
FIG. 7 is a schematic block diagram of a transmitting end performing precoding and analog beamforming according to an embodiment.

FIG. 7 is a schematic block diagram of a transmitting end performing precoding and analog beamforming according to an embodiment.

Referring to FIG. 7, a spherical interpolation-based precoding block 710, an IDFT and P/S block 720, and a CP inserter 730 correspond to the precoder 110_$k$, the inverse discrete Fourier transformer 130, the P/S converter 150, and the CP inserter 170 of FIG. 1, and thus a description thereof will not be given herein.

When M digital baseband signals are generated the above-described spherical interpolation-based precoding, IDFT, P/S conversion, and addition of CP, a transmitting end 700 may convert each of the M digital baseband signals into an analog signal using a D/A converter 740. An analog beamforming block 750 may perform analog beamforming through Equation 9 below to generate a waveform for transmitting the converted analog signal through $M_A$ transmitting antennas.

$$\begin{bmatrix} z_1(t) \\ z_2(t) \\ \vdots \\ z_{M_A}(t) \end{bmatrix} = \begin{bmatrix} e^{j\theta_{1,1}} & e^{j\theta_{1,2}} & \cdots & e^{j\theta_{1,M}} \\ e^{j\theta_{2,1}} & e^{j\theta_{2,2}} & \cdots & e^{j\theta_{2,M}} \\ e^{j\theta_{3,1}} & e^{j\theta_{3,2}} & \cdots & e^{j\theta_{3,M}} \\ \vdots & \vdots & \ddots & \vdots \\ e^{j\theta_{M_A,1}} & e^{j\theta_{M_A,2}} & \cdots & e^{j\theta_{M_A,M}} \end{bmatrix} \begin{bmatrix} a_1(t) \\ a_2(t) \\ \vdots \\ a_M(t) \end{bmatrix} \quad \text{[Equation 9]}$$

Where $a_m(t)$ is the $m^{th}$ signal subjected to D/A conversion, and $z_j(t)$ is an analog waveform transmitted through the $j^{th}$ transmitting antenna. In addition, $\theta_{j,m}$ is a phase for generating $z_j(t)$ by applying beamforming to $a_m(t)$ ($m \in \{1, 2, \ldots, M\}$, $j \in \{1, 2, \ldots, M_A\}$). $\theta_{j,m}$ is determined using downlink channel information estimated by a receiving end using a downlink pilot or reference signal and fed back to a transmitting end, or is set using channel information estimated in uplink using uplink channel symmetry. If analog beamforming is added, in operation S610 of FIG. 6, when calculating a sum transmission rate or detection signal-to-noise ratio of a cluster to determine the optimal precoding matrix $Q_1^{(k)}$ for a subcarrier selected in the first cluster, the analog beamforming process expressed in Equation 9 needs to be considered. In addition, even when calculating a performance reference value $\Gamma_n$ based on the sum data rate or the detection signal-to-noise ratio in operation S635 of FIG. 6, the analog beamforming process of Equation 9 needs to be considered.

According to an embodiment, a transmitting end applies a spherical interpolation technique to precoding matrices for some of subcarriers allocated to a receiving end to obtain precoding matrices for the allocated subcarriers, and performs precoding using the obtained precoding matrices, thereby further improving precoding performance.

In addition, the receiving end transmits only a codebook index corresponding to the precoding matrices for some subcarriers from among the allocated subcarriers to the transmitting end, thereby preventing an excessive increase in the amount of feedback information and enabling efficient communication.

While the disclosure has been particularly shown and described with reference to embodiments thereof, it will be understood that various changes in form and details may be made therein without departing from the spirit and scope of the following claims.

Descriptions of features or aspects within each embodiment should typically be considered as available for other similar features or aspects in other embodiments.

What is claimed is:

1. A communication node of a multi-antenna multi-carrier system, the communication node comprising a precoder configured to perform precoding on a signal to be transmitted to another communication node connected to the communication node, wherein the precoder comprises:
    a serial-to-parallel (S/P) converter configured to generate a plurality of vector signals allocated to respective subcarriers allocated to the another communication node by performing S/P conversion on a signal including a plurality of modulated symbols;
    at least one spherical interpolator, when precoding matrices corresponding to some subcarriers from among the subcarriers allocated to the another communication node are input, configured to obtain the precoding matrices for at least some subcarriers from among the allocated subcarriers by performing spherical interpolation on input precoding matrices;
    a precoding matrix-subcarrier mapping block configured to map the obtained precoding matrices for the at least some subcarriers to the subcarriers allocated to the another communication node; and
    at least one precoding block configured to perform precoding on the plurality of vector signals using the mapped precoding matrices,
wherein the at least one spherical interpolator is configured to:
    perform logarithmic mapping on two adjacent precoding matrices,
    perform singular value decomposition on log-mapped matrices, and
    obtain the precoding matrices for at least some subcarriers through generalized exponential mapping using the results of singular value decomposition.

2. The communication node of claim 1, wherein the at least one spherical interpolator obtains precoding matrices for at least some subcarriers from among the allocated subcarriers by performing spherical interpolation on two adjacent precoding matrices from among the precoding matrices corresponding to the some subcarriers, respectively.

3. The communication node of claim 2, wherein the at least one spherical interpolator performs the spherical interpolation to obtain precoding matrices for all the allocated subcarriers, and
    the precoding matrix-subcarrier mapping block maps the obtained precoding matrices for all the allocated subcarriers to the allocated subcarriers.

4. The communication node of claim 2, wherein the at least one spherical interpolator performs the spherical interpolation to obtain precoding matrices for some subcarriers from among the allocated subcarriers,
    the obtained precoding matrices correspond to precoding matrices respectively corresponding to clusters in which the allocated subcarriers are divided into a certain number of consecutive subcarriers, and
    the precoding matrix-subcarrier mapping block maps an identical precoding matrix to subcarriers included in an identical cluster.

5. The communication node of claim 1, further comprising:
    a receiver configured to receive information on precoding matrices corresponding to the some subcarriers from the another communication node.

6. The communication node of claim 5, wherein the receiver receives codebook indices corresponding to precoding matrices corresponding to the some subcarriers, and
    the precoder obtains precoding matrices corresponding to the some subcarriers based on the received codebook indices.

7. The communication node of claim 1, further comprising:
    an inverse discrete Fourier transformer configured to convert each of a plurality of vector signals precoded by the at least one precoding block into a time-domain signal;
    a parallel-to-serial (P/S) converter configured to perform P/S conversion of the converted time-domain signals;
    a cyclic prefix (CP) inserter configured to insert a CP into a P/S converted signal; and
    a plurality of antennas configured to transmit a CP-inserted signal to the another communication node.

8. The communication node of claim 1, wherein the communication node is implemented as a base station, a router, or a remote unit of a repeater.

9. A communication node included in a multi-antenna multi-carrier system, the communication node comprising:
a channel estimator configured to estimate a downlink frequency domain channel using a pilot or reference signal included in a downlink signal received from another communication node through a plurality of antennas;
a precoding matrix selector configured to select precoding matrices corresponding to some subcarriers from among subcarriers allocated to the communication node, based on the estimated downlink frequency domain channel; and
a transmitter configured to transmit information about the selected precoding matrices to the another communication node,
wherein the precoding matrix selector is configured to:
select some subcarriers from among the allocated subcarriers, and
define a first precoding matrix for a first subcarrier from among the selected some subcarriers, and
define a precoding matrix for each of the selected remaining subcarriers based on the first precoding matrix for the first subcarrier and spherical interpolation between adjacent subcarriers, and
wherein the precoding matrix selector performs spherical interpolation on a precoding matrix for an $m^{th}$ subcarrier and each of precoding matrix candidates for an $(m+1)^{th}$ subcarrier from among the selected subcarriers, and calculates a performance reference value for a result of the spherical interpolation and defines one of the precoding matrix candidates for the $(m+1)^{th}$ subcarrier as a precoding matrix for the $(m+1)^{th}$ subcarrier,
wherein m increases sequentially from 1, and
wherein the performance reference value comprises an aggregate transmission rate or a signal-to-noise ratio.

10. The communication node of claim 9, wherein the precoding matrix selector selects the some subcarriers by selecting one subcarrier in each of clusters in which the allocated subcarriers are divided into a certain number of consecutive subcarriers, and
defines one of a plurality of predefined precoding matrix candidates as the first precoding matrix based on a sum transmission rate or signal-to-noise ratio of a first cluster including the first subcarrier.

11. The communication node of claim 9, further comprising:
a codebook index converter configured to convert each of the selected precoding matrices into a codebook index, and
the transmitter transmits the converted codebook index to the another communication node.

12. The communication node of claim 9, wherein the communication node is implemented as a terminal receiving a communication service through connection with the another communication node.

13. A signal processing method of a multi-antenna multi-carrier system, the signal processing method comprising:
performing, by a transmitting end of the multi-antenna multi-carrier system, precoding on a signal to be transmitted to a receiving end connected to the transmitting end;
transmitting, by the transmitting end, a precoded downlink signal to the receiving end; and
transmitting, by the receiving end, information about precoding matrices based on the downlink signal received from the transmitting end to the transmitting end,
wherein the performing precoding comprises:
generating a plurality of vector signals allocated to respective subcarriers allocated to the receiving end by performing serial-to-parallel (S/P) conversion on a signal to be transmitted to the receiving end;
performing spherical interpolation on the precoding matrices corresponding to some subcarriers from among the subcarriers allocated to the receiving end;
obtaining the precoding matrices for at least some subcarriers from among the allocated subcarriers based on the performed spherical interpolation;
mapping the obtained precoding matrices to the allocated subcarriers; and
performing precoding on the plurality of vector signals using the mapped precoding matrices,
wherein the obtained precoding matrices correspond to the precoding matrices respectively corresponding to clusters in which the allocated subcarriers are divided into a certain number of consecutive subcarriers,
wherein the obtaining precoding matrices for at least some subcarriers from among the allocated subcarriers based on the performed spherical interpolation comprises:
performing logarithmic mapping on two adjacent precoding matrices,
performing singular value decomposition on log-mapped matrices, and
obtaining the precoding matrices for at least some subcarriers through generalized exponential mapping using the results of singular value decomposition.

14. The signal processing method of claim 13, wherein the performing spherical interpolation comprises:
performing spherical interpolation on two adjacent precoding matrices from among the precoding matrices corresponding to the some subcarriers.

15. The signal processing method of claim 13, wherein the transmitting information about precoding matrices to the transmitting end comprises:
estimating a downlink frequency domain channel using a pilot or reference signal included in the received downlink signal;
selecting precoding matrices corresponding to some subcarriers from among the subcarriers allocated to the receiving end, based on the estimated downlink frequency domain channel;
converting each of the selected precoding matrices into a codebook index; and
transmitting the converted codebook index to the transmitting end.

16. The signal processing method of claim 15, wherein the selecting precoding matrices comprises:
selecting the some subcarriers by selecting one subcarrier in each of clusters in which the allocated subcarriers are divided into the certain number of consecutive subcarriers;
defining a first precoding matrix for a first subcarrier from among the selected some subcarriers; and
defining a precoding matrix for each of the selected remaining subcarriers based on the first precoding matrix for the first subcarrier and spherical interpolation between adjacent subcarriers.

* * * * *